(12) United States Patent
Monkowski et al.

(10) Patent No.: US 9,400,004 B2
(45) Date of Patent: Jul. 26, 2016

(54) TRANSIENT MEASUREMENTS OF MASS FLOW CONTROLLERS

(75) Inventors: Joseph R. Monkowski, Danville, CA (US); Adam J. Monkowski, Pleasanton, CA (US); Jialing Chen, San Jose, CA (US); Tao Ding, Pleasanton, CA (US)

(73) Assignee: PIVOTAL SYSTEMS CORPORATION, Pleasanton, CA (US)

( * ) Notice: Subject to any disclaimer, the term of this patent is extended or adjusted under 35 U.S.C. 154(b) by 1110 days.

(21) Appl. No.: 13/306,940

(22) Filed: Nov. 29, 2011

(65) Prior Publication Data

US 2012/0132291 A1    May 31, 2012

Related U.S. Application Data

(60) Provisional application No. 61/417,842, filed on Nov. 29, 2010.

(51) Int. Cl.
*F16K 31/12* (2006.01)
*F16K 31/36* (2006.01)
*F15D 1/02* (2006.01)
(Continued)

(52) U.S. Cl.
CPC ............. *F15D 1/025* (2013.01); *G01F 25/003* (2013.01); *G01F 25/0053* (2013.01); *G05D 7/0635* (2013.01); *G05D 16/202* (2013.01); *Y10T 137/0396* (2015.04); *Y10T 137/8158* (2015.04)

(58) Field of Classification Search
CPC ................... Y10T 137/7761; Y10T 137/7759; Y10T 137/0379; Y10T 137/0396; Y10T 137/776; Y10T 137/7762; G05D 7/0635; G05D 16/202

USPC ......... 137/12, 87.04, 487, 487.5, 488, 11, 14, 137/87.03, 87.01, 461, 557, 554, 553, 556; 70/50; 702/50, 55, 47, 45, 100; 7/1.35, 7/861; 73/1.35, 861, 861.42, 861.43, 73/1.16; 700/282
See application file for complete search history.

(56) References Cited

U.S. PATENT DOCUMENTS 4,114,419 A    9/1978    Kimbell
4,285,245 A    8/1981    Kennedy
(Continued)

FOREIGN PATENT DOCUMENTS

CN         1839358 A      9/2006
CN       101115919 A      1/2008
(Continued)

OTHER PUBLICATIONS

"Fundamentals of Mass Flow Control: Critical Terminology and Operation Principles for Gas and Liquid MFC's", Advanced Energy, White Paper, Advanced Energy Industries, Inc., 2005, 5 pages.
(Continued)

*Primary Examiner* — Mary McManmon
*Assistant Examiner* — Hailey K Do
(74) *Attorney, Agent, or Firm* — Nixon Peabody LLP; Joseph Bach, Esq.

(57) ABSTRACT

An apparatus to measure the transient response of a mass flow controller (MFC). The size of a variable orifice, upstream of the MFC, is controlled such that the pressure between the orifice and the MFC is held constant during the entire time that the MFC is going through its transient response. The known relationship between the size of the orifice and the flow through it allows a determination of the transient response of the MFC.

8 Claims, 4 Drawing Sheets

(51) Int. Cl.
  *G05D 16/20* (2006.01)
  *G05D 7/06* (2006.01)
  *G01F 25/00* (2006.01)

(56) References Cited

U.S. PATENT DOCUMENTS

| | | | |
|---|---|---|---|
| 4,560,871 A | 12/1985 | Bowman et al. |
| 4,617,952 A | 10/1986 | Fujiwara et al. |
| 4,695,034 A | 9/1987 | Shimizu et al. |
| 5,062,446 A | 11/1991 | Anderson |
| 5,092,360 A | 3/1992 | Watanabe et al. |
| 5,094,430 A | 3/1992 | Shirai et al. |
| 5,142,781 A | 9/1992 | Mettner et al. |
| 5,145,147 A | 9/1992 | Nakazawa et al. |
| 5,154,206 A | 10/1992 | Gillott et al. |
| 5,161,774 A | 11/1992 | Engelsdorf et al. |
| 5,224,843 A | 7/1993 | van Lintel |
| 5,238,223 A | 8/1993 | Mettner et al. |
| 5,388,984 A | 2/1995 | Meslif |
| 5,497,804 A | 3/1996 | Codina et al. |
| 5,566,710 A | 10/1996 | Dahlgren et al. |
| 5,593,134 A | 1/1997 | Steber et al. |
| 5,624,409 A | 4/1997 | Seale |
| 5,647,574 A | 7/1997 | Mettner et al. |
| 5,684,245 A | 11/1997 | Hinkle |
| 5,730,861 A | 3/1998 | Sterghos et al. |
| 5,785,087 A | 7/1998 | Takahashi et al. |
| 5,787,915 A | 8/1998 | Byers et al. |
| 5,839,467 A | 11/1998 | Saaski et al. |
| 5,856,743 A | 1/1999 | Juniman |
| 5,868,159 A | 2/1999 | Loan et al. |
| 5,925,829 A | 7/1999 | Laragione et al. |
| 5,926,955 A | 7/1999 | Kober |
| 5,942,892 A | 8/1999 | Li |
| 5,997,280 A | 12/1999 | Welz, Jr. et al. |
| 6,062,256 A | 5/2000 | Miller et al. |
| 6,113,695 A | 9/2000 | Fujimoto |
| 6,138,708 A | 10/2000 | Waldbusser |
| 6,142,444 A | 11/2000 | Kluge |
| 6,182,941 B1 | 2/2001 | Scheurenbrand et al. |
| 6,216,726 B1 | 4/2001 | Brown et al. |
| 6,230,731 B1 | 5/2001 | Miller et al. |
| 6,230,738 B1 | 5/2001 | Watanabe et al. |
| 6,240,962 B1 | 6/2001 | Tai et al. |
| 6,244,296 B1 | 6/2001 | Lafler et al. |
| 6,247,493 B1 | 6/2001 | Henderson |
| 6,267,146 B1 | 7/2001 | Miyazoe et al. |
| 6,276,385 B1 | 8/2001 | Gassman |
| 6,321,781 B1 | 11/2001 | Kurth |
| 6,363,958 B1 | 4/2002 | Ollivier |
| 6,382,226 B1 | 5/2002 | Larson et al. |
| 6,412,444 B1 | 7/2002 | Esham |
| 6,450,200 B1 | 9/2002 | Ollivier |
| 6,460,567 B1 | 10/2002 | Hansen, III et al. |
| 6,519,508 B1 | 2/2003 | Saito |
| 6,520,479 B1 | 2/2003 | Sato |
| 6,581,623 B1 * | 6/2003 | Carpenter et al. ............ 137/113 |
| 6,627,465 B2 | 9/2003 | Sandhu et al. |
| 6,648,019 B2 | 11/2003 | Gagnon |
| 6,761,063 B2 | 7/2004 | Mengle |
| 6,782,906 B2 | 8/2004 | Chang |
| 6,811,136 B2 | 11/2004 | Eberhardt et al. |
| 6,948,508 B2 | 9/2005 | Shajii et al. |
| 6,968,859 B1 | 11/2005 | Nagano et al. |
| 7,089,134 B2 | 8/2006 | Barros et al. |
| 7,136,767 B2 | 11/2006 | Shajii et al. |
| 7,204,158 B2 | 4/2007 | Morgan et al. |
| 7,283,894 B2 | 10/2007 | Esposito et al. |
| 7,412,986 B2 | 8/2008 | Tison et al. |
| 7,569,049 B1 | 8/2009 | Blischak |
| 7,809,473 B2 | 10/2010 | Shajii et al. |
| 7,823,436 B2 | 11/2010 | Monkowski et al. |
| 7,875,398 B2 | 1/2011 | Kokubo |
| 7,882,852 B2 | 2/2011 | Coakley et al. |
| 7,918,238 B2 | 4/2011 | Tanaka et al. |
| 7,992,395 B2 | 8/2011 | Zhang et al. |
| 8,240,324 B2 | 8/2012 | Monkowski et al. |
| 8,265,888 B2 | 9/2012 | Chung et al. |
| 8,271,210 B2 | 9/2012 | Chung et al. |
| 8,271,211 B2 | 9/2012 | Chung et al. |
| 8,667,830 B2 | 3/2014 | Monkowski et al. |
| 8,757,197 B2 * | 6/2014 | Hirata et al. ............... 137/487.5 |
| 8,857,456 B2 | 10/2014 | Monkowski et al. |
| 2001/0038083 A1 | 11/2001 | Sakurai |
| 2002/0108652 A1 | 8/2002 | Palmer |
| 2003/0010948 A1 | 1/2003 | Horiuchi et al. |
| 2003/0159735 A1 | 8/2003 | Barillot et al. |
| 2003/0172975 A1 | 9/2003 | Gilbert et al. |
| 2005/0199301 A1 | 9/2005 | Frisch |
| 2005/0221147 A1 | 10/2005 | Shioya et al. |
| 2006/0006484 A1 | 1/2006 | Seneviratne et al. |
| 2006/0278276 A1 | 12/2006 | Tanaka et al. |
| 2007/0044851 A1 | 3/2007 | Gilbert et al. |
| 2007/0241296 A1 | 10/2007 | Prieto Barranco et al. |
| 2008/0173010 A1 * | 7/2008 | Suresh et al. ............ F01N 11/00 60/287 |
| 2009/0266139 A1 | 10/2009 | Gregor et al. |
| 2010/0243076 A1 | 9/2010 | Hayashi |
| 2011/0108126 A1 | 5/2011 | Monkowski et al. |
| 2011/0320162 A1 | 12/2011 | Kah |
| 2012/0204979 A1 | 8/2012 | Pan |
| 2012/0304781 A1 | 12/2012 | Monkowski et al. |
| 2014/0366952 A1 | 12/2014 | Monkowski et al. |
| 2014/0367596 A1 | 12/2014 | Monkowski et al. |

FOREIGN PATENT DOCUMENTS

| | | | |
|---|---|---|---|
| CN | 101978132 A | 2/2011 |
| CN | 102687087 A | 9/2012 |
| CN | 104615157 A | 5/2015 |
| DE | 10314386 A1 | 10/2004 |
| EP | 2247819 A1 | 11/2010 |
| EP | 2488925 A1 | 8/2012 |
| JP | 60-62118 U | 5/1985 |
| JP | 62-141381 A | 6/1987 |
| JP | 2-163580 A | 6/1990 |
| JP | 11-223538 A | 8/1999 |
| JP | 2000-507681 A | 6/2000 |
| JP | 2001-502248 A | 2/2001 |
| JP | 2002-099330 A | 4/2002 |
| JP | 2002-200597 A | 7/2002 |
| JP | 2002-205022 A | 7/2002 |
| JP | 2003-028317 A | 1/2003 |
| JP | 2003-529218 A | 9/2003 |
| JP | 2006-038832 A | 2/2006 |
| JP | 2008-089607 A | 4/2008 |
| JP | 2009-294820 A * | 12/2009 | ............ F16K 31/02 |
| JP | 2011-510404 A | 3/2011 |
| JP | 2013-508825 A | 3/2013 |
| JP | 2013-239201 A | 11/2013 |
| JP | 5654099 B2 | 11/2014 |
| JP | 2015-064893 A | 4/2015 |
| KR | 10-2010-0114079 A | 10/2010 |
| KR | 10-2012-0095362 A | 8/2012 |
| TW | 1399627 B1 | 6/2013 |
| TW | 1435196 B | 4/2014 |
| WO | 2006/014508 A2 | 2/2006 |
| WO | 2008/129783 A1 | 10/2008 |
| WO | 2009091935 A1 | 7/2009 |
| WO | 2011047361 A1 | 4/2011 |

OTHER PUBLICATIONS

International Search Report and Written Opinion in International Application No. PCT/US2009/031170 mailed Mar. 23, 2009. (Matter 1001).

International Preliminary Report on Patentability in International Application No. PCT/US2009/031170 mailed Jul. 29, 2010. (Matter 1001).

First Office Action in Chinese Patent Application No. 200980109390.3 dated Dec. 17, 2012. (Matter 1017).

Second Office Action in Chinese Patent Application No. 200980109390.3 dated Sep. 29, 2013. (Matter 1017).

(56) References Cited

OTHER PUBLICATIONS

Third Office Action in Chinese Patent Application No. 200980109390.3 dated May 16, 2014. (Matter 1017).
Notice of Refusal in Japanese Patent Application No. 2010-543262 dated Jan. 29, 2013. (Matter 1041).
Decision of Rejection for Japanese Patent Application No. 2010-543262 dated Oct. 1, 2013. (Matter 1041).
Examination Report in Taiwanese Patent Application No. 98101722 dated Dec. 6, 2012. (Matter 1073).
Notice of Allowance in Taiwanese Patent Application No. 98101722 dated May 13, 2013. (Matter 1073).
Notice of Refusal in Japanese Patent Application No. 2013-156603 mailed on Apr. 15, 2014. (Matter 1141).
Invitation to Pay Additional Fees in International Application No. PCT/US2010/052974 dated Dec. 28, 2010. (Matter 4001).
International Search Report and Written Opinion in International Application No. PCT/US2010/052974 dated Mar. 11, 2011. (Matter 4001).
International Preliminary Report on Patentability in International Application No. PCT/US2010/052974 dated Apr. 26, 2012. (Matter 4001).
Examination Report in European Patent Application No. 10 779 088.3 dated Oct. 30, 2013. (Matter 4004).
Office Action in Chinese Patent Application No. 201080046178.X dated Mar. 4, 2014. (Matter 4017).
Notice of Refusal in Japanese Patent Application No. 2012-534432 mailed on Jul. 15, 2014. (Matter 4041).
Examination Report in Taiwanese Patent Application No. 99135139 dated Jun. 26, 2013. (Matter 4073).
Notice of Allowance in Taiwanese Patent Application No. 99135139 dated Mar. 5, 2014. (Matter 4073).
Restriction Requirement in U.S. Appl. No. 12/354,723 dated Mar. 10, 2010. (Matter 1000).
Office Action in U.S. Appl. No. 12/354,723 dated Apr. 21, 2010. (Matter 1000).
Notice of Allowance in U.S. Appl. No. 12/354,723 dated Jun. 29, 2010. (Matter 1000).
Restriction Requirement in U.S. Appl. No. 12/355,654 dated Aug. 3, 2011. (Matter 1100).
Office Action in U.S. Appl. No. 12/355,654 dated Jan. 20, 2012. (Matter 1100).
Notice of Allowance in U.S. Appl. No. 12/355,654 dated Apr. 17, 2012. (Matter 1100).
Restriction Requirement in U.S. Appl. No. 12/891,714 dated Oct. 12, 2012. (Matter 1200).
Office Action in U.S. Appl. No. 12/891,714 dated Nov. 15, 2012. (Matter 1200).
Notice of Allowance in U.S. Appl. No. 12/891,714 dated Jun. 26, 2013. (Matter 1200).
Notice of Allowance in U.S. Appl. No. 12/891,714 dated Nov. 7, 2013. (Matter 1200).
Office Action in U.S. Appl. No. 13/584,736 dated Nov. 20, 2013. (Matter 1300).
Notice of Allowance in U.S. Appl. No. 13/584,736 dated May 29, 2014. (Matter 1300).
Advisory Action in U.S. Appl. No. 12/906,058 dated Feb. 20, 2014. (Matter 4000).
Office Action in U.S. Appl. No. 12/906,058 dated Sep. 9, 2013. (Matter 4000).
Office Action in U.S. Appl. No. 12/906,058 dated Jan. 22, 2013. (Matter 4000).
Office Action in U.S. Appl. No. 12/634,568 dated Mar. 9, 2012. (Matter 5000).
Notice of Allowance in U.S. Appl. No. 12/634,568 dated May 29, 2012. (Matter 5000).
Office Action in U.S. Appl. No. 12/634,593 dated Mar. 12, 2012. (Matter 5100).
Notice of Allowance in U.S. Appl. No. 12/634,593 dated May 18, 2012. (Matter 5100).
Office Action in U.S. Appl. No. 12/634,629 dated Mar. 12, 2012. (Matter 5200).
Notice of Allowance in U.S. Appl. No. 12/634,629 dated May 11, 2012. (Matter 5200).
Decision of Grant for Japanese Patent Application No. 2013-156603 dated Oct. 21, 2014.
Office Action for Chinese Patent Application No. 200980109390.3 dated Nov. 13, 2014.
Notification of the Division for Chinese Patent Application No. 201080046178.X dated Dec. 1, 2014.
Office Action in Korean Patent Application No. 2010-7018060 dated Feb. 5, 2015.
Decision of Refusal in Japanese Patent Application No. 2012-534432 dated Apr. 7, 2015.
Office Action for Korean Patent Application No. 2010-7018060 dated Oct. 7, 2015.
Office Action for Japanese Patent Application No. 2014-234087 dated Dec. 8, 2015.
Restriction Requirement in U.S. Appl. No. 14/475,494 dated Oct. 27, 2015.
Office Action for Korean Patent Application No. 2010-7018060 dated Jun. 23, 2015.
Office Action for Chinese Patent Application No. 201080046178.X dated Jun. 17, 2015.
Written Report of Re-Examination for Korean Patent Application No. 2010-7018060 dated Feb. 19, 2016.
Office Action for Chinese Patent Application No. 201080046178.X dated Jan. 8, 2016.
Office Action in U.S. Appl. No. 14/475,472 dated Jan. 22, 2016.
Office Action for U.S. Appl. No. 14/475,494 dated Jan. 22, 2016.

* cited by examiner

TRANSIENT MEASUREMENTS OF MASS FLOW CONTROLLERS

RELATED APPLICATION

This application claims priority to and the benefit of U.S. Provisional Application No. 61/417,842, filed on Nov. 29, 2010, the disclosure of which is hereby incorporated herein by reference in its entirety.

BACKGROUND

Metering the mass flow rate of a gas is important for many industrial processes. In the case of the semiconductor industry, metering must be especially accurate, because deviations in the flow rate of only several percent can lead to process failures.

The industry-standard flow control device is a mass flow controller (MFC) containing a flow restriction in the form of a valve that can be partially opened to allow increased flow or partially closed to decrease flow. The opening of the valve is controlled by a closed loop feedback circuit that minimizes the difference between an externally provided set point and the reading from an internal flow measuring device. The flow measuring device uses a thermal sensor with two resistance-thermometer elements wound around the outside of a tube through which the gas flows. The elements are heated by applying an electric current. As the gas flows through the tube, it picks up heat from the first element and transfers it to the second element. The resulting temperature differential between the two elements is a measure of the mass flow rate of the gas. In the newer, pressure insensitive MFCs, a pressure transducer is included between the thermal sensor and the control valve to account for the effects of changing pressure on flow.

When the flow of gas through the MFC is changing, the thermal sensor will not be in a steady state condition. Furthermore, the thermal sensor requires some amount of time, typically 0.5 to 3 seconds, after the flow has stopped changing, to attain a steady state temperature difference between the two elements. As a result of this behavior, when the MFC is commanded to move to a certain flow set point, there will be a period of time during which the flow is not at the desired value. In some MFCs, the flow increases monotonically to the set point; in other MFCs, there can be significant overshoot of the flow rate before it settles to its desired level. The flow behavior during this period of time when the flow has not yet settled to its desired value is referred to as the "transient" response of the MFC.

Manufacturers of MFCs focus heavily on making certain that steady state flows are as accurate as possible. The only significant attention paid to the transient response is its duration. The "settling time" specification of an MFC is the maximum time required for the MFC to settle to within some percentage of its desired flow rate. Nevertheless, with process requirements, especially in the semiconductor industry, becoming more demanding, and processes frequently being only seconds long, the transient response of MFCs is becoming increasingly important.

Measurement of the transient response, however, has been challenging. Various techniques exist to measure steady state flows with a high level of accuracy. For example, a rate of rise (or rate of drop) measurement is performed by flowing gas through the MFC into (or out of) a known volume and measuring the pressure rise (or drop) in the volume. The actual flow rate can be determined by calculating the rate of pressure rise or drop and using established pressure-temperature-volume gas relations to calculate the number of moles of gas flowing through the MFC.

Another method for measuring flow rate is that of measuring the pressure drop across a flow restriction, where the flow restriction is placed either upstream or downstream of the MFC. With a relationship established a priori between the pressure drop across the flow restriction and the flow through the flow restriction, the flow through the MFC can be determined.

Unfortunately, these measurement techniques typically require a measurement time that is very long compared to the transient response. A rate of rise measurement, for example, can take as long as a minute, especially for the lower flow rates, such as 1 sccm (standard cubic centimeters per minute). In addition, these measurements frequently change either the upstream or downstream pressure during the transient response of the MFC. This changing pressure can influence the response of the MFC, making it unclear as to what is the true transient response of the MFC and what is being observed only as a result of the way in which the measurement is being made.

The shortcomings of current flow measurement techniques for measurement of MFC transient responses, especially with the accuracy and time resolution that is desired, illustrate why an improved gas flow transient measurement scheme is desirable.

Key requirements for gas flow transient measurements are the following:
  a sufficient time resolution, such as tens of milliseconds
  an accuracy of approximately 1% of the actual flow
  no perturbation of the pressure upstream of the MFC under test
  no perturbation of the pressure downstream of the MFC under test.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

According to disclosed embodiments, a very fast and accurate gas flow controller is positioned upstream of the MFC under test. If this gas flow controller were being used in its typical mode, i.e., as a means to control the flow of a gas, it would make certain measurements, such as pressure and temperature, and it would control a valve in such a way, based on these measurements, that the flow of gas exiting the gas flow controller was at the desired flow rate.

In the disclosed embodiments, however, it is not the flow that is being controlled, but the pressure downstream of the gas flow controller. This is shown in the embodiment depicted schematically in FIG. 1, where the gas flow controller 100, comprising a controller/recorder 102, a first pressure/temperature transducer 101, a piezoelectric control valve 104, and second pressure transducer 103, is positioned between an upstream gas source 120 and a downstream MFC under test 110.

Figure 1:
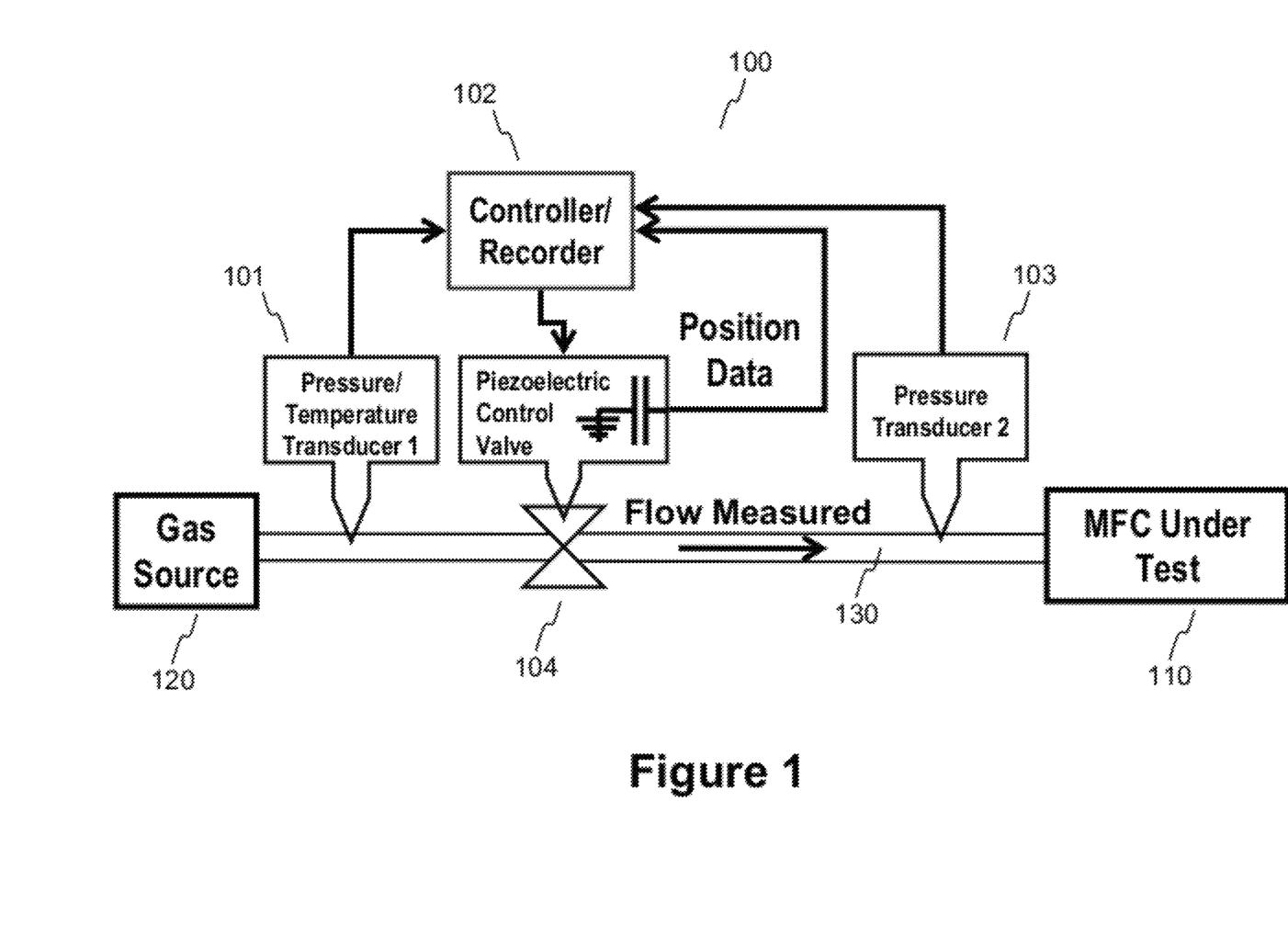
FIG. 1 is a simplified schematic diagram of an embodiment of an apparatus in accordance with the present invention for transient measurements of mass flow controllers.

The gas controller is programmed such that it allows exactly the correct amount of gas to flow through the piezoelectric control valve 104 such that the pressure in the conduit 130 is always held at the same pressure. This action is effected by the controller/recorder detecting any change in pressure in the conduit 130 by noting the signal being produced by second pressure transducer 103, and opening or closing the piezoelectric control valve 104 exactly the correct amount to counteract this pressure change.

Under these conditions, where the pressure in conduit 130 does not change, the flow out of the gas flow controller is equal to the flow into the MFC under test 110. The flow out of the gas flow controller is determined by the controller/recorder 102, which calculates the flow rate through the gas flow controller at desired intervals based on the pressure, temperature, and valve position that were measured and recorded for each of those times.

For MFCs with thermal sensors, if the pressure upstream of the MFC is constant, the flow out of the MFC is equal to the flow into the MFC; consequently, the flow determined by the gas flow controller is equal to the transient response of the MFC. For other types of MFCs, the flow out of the MFC can be calculated from the flow into the MFC with an appropriate algorithm.

Other aspects and features of the invention would be apparent from the detailed description, which is made with reference to the following drawings. It should be appreciated that the detailed description and the drawings provides various non-limiting examples of various embodiments of the invention, which is defined by the appended claims.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

FIG. 1 shows an illustrative embodiment of the invention. One of the features of the invention is that the pressure immediately upstream of the mass flow controller (MFC) and the pressure immediately downstream of the MFC are held constant throughout the measurement. The significance of this feature is that it is characteristic of the environment in which an MFC is typically used. In typical use, a pressure regulator upstream of the MFC holds the pressure constant, and the downstream pressure is defined by the process chamber, which is typically at vacuum or at atmospheric pressure.

Figure 2:
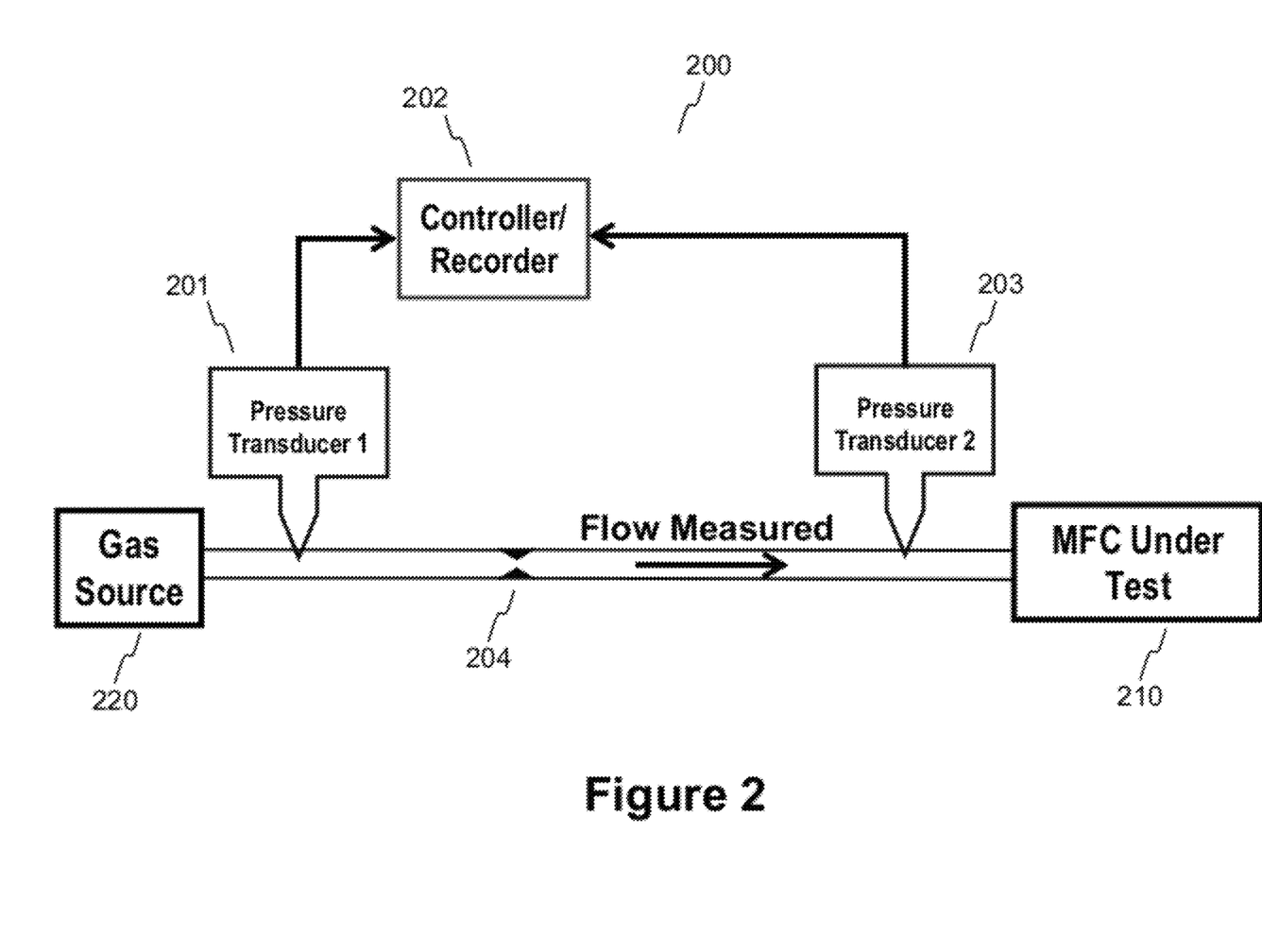
FIG. 2 is a simplified schematic diagram of a prior art apparatus for flow measurement.

FIG. 2 shows a typical prior art flow measurement scheme. In this approach, the measured flow is related to the pressure drop across the orifice 204, which serves as a flow restriction. Prior to use as a measurement device, the orifice is calibrated such that the relationship between flow rate and pressure drop is determined. During use, as shown in FIG. 2, the first pressure transducer 201 measures the pressure upstream of the orifice and second pressure transducer 203 measures the pressure downstream of the orifice. Calculation of the difference between these two pressure measurements provides the pressure drop across the orifice 204, and with this pressure drop in conjunction with the calibration table that relates flow rate and pressure drop, the flow through the orifice can be determined.

During steady state flow, the pressure drop across the orifice is constant, and so the pressure immediately upstream of the MFC is constant. As such, this measurement approach works well for steady state flows. During the transient, however, when the flow is changing, the pressure drop across the orifice is changing, and since the pressure upstream of the MFC is the gas source pressure minus the pressure drop across the orifice, the pressure upstream of the MFC is changing. This changing pressure can influence the behavior of the MFC in ways that would not be representative of the MFC when used in typical applications. Another source of error is the increase (or decrease) of gas between the orifice and the MFC during an increase (or decrease) in pressure. Since a premise of the measurement is that the flow through the orifice is equal to the flow through the MFC, if there is a change in the amount of gas between the orifice and MFC, then these flows will not be equal and there will be an associated error in the measurement.

The approach shown in FIG. 2 uses a fixed orifice. With a fixed orifice, if the flow changes, the pressure across the orifice will change. In contrast, the approach shown in FIG. 1 uses a variable orifice. With a variable orifice, it is possible to adjust the size of the orifice such that for every flow the pressure is always the same. This is an aspect of the present invention, where the position of the control valve determines the size of the orifice.

Another requirement for the variable orifice in the present invention is that the relationship between the size of the orifice and the flow rate be well determined. This requires that the control valve have a sensor to measure its position. One approach to including such a sensor is described in U.S. Patent Application U.S. 2011/0108126 A1, where the position of a piezoelectric control valve is measured by a parallel plate capacitance sensor. Other types of control valves, for example those that use a solenoid instead of a piezoelectric actuator, or those that use other types of position sensors, such as a strain gauge position sensor, can also be used in the present invention.

The pressure transducers can be any of those typically used in the semiconductor industry, such as those that use a capacitance measurement or those that use a piezoresistive measurement. In order to assure high accuracy measurement with the present invention, the pressure transducers should have an inaccuracy less than or equal to approximately 0.25% of the reading.

With the embodiment shown in FIG. 1, the procedure for making a transient measurement on the MFC is described in the following steps:

1. The control valve 104 is opened to its maximum desirable position.
2. The MFC 110 is turned on to its desired flow rate and allowed to flow until steady state is reached, which typically takes no more than a few seconds.
3. The pressure drop across the control valve is determined by subtracting the pressure of second Pressure Transducer 103 from that of first Pressure Transducer 101.
4. The pressure drop measured in Step 3 is the pressure drop required for the desired flow through the MFC; however, during the transient, the flow can overshoot to levels above the desired flow. Consequently, a pressure drop larger than that measured in Step 3 will be necessary. Typically, a pressure drop twice this value will be adequate.
5. Using a combination of the control valve and the MFC, the pressure between the control valve and the MFC is set such that the pressure drop across the control valve is equal to that established in Step 4. The pressure can be increased by opening the control valve while the MFC is turned off, or it can be decreased by turning on the MFC while the control valve is closed.
6. The control valve is closed and the MFC is turned off, making certain to maintain the pressure between the control valve and the MFC that was set in Step 5.
7. The Controller/Recorder 104 is instructed to change the position of the control valve as needed to keep the reading of the second Pressure Transducer 103 unchanged.
8. The MFC is turned on to the desired flow rate, and is allowed to flow until steady state is reached, which is typically no more than a few seconds.
9. During step 8, the Controller/Recorder 102 controls the position of the control valve 104 such that the pressure measured by the second Pressure Transducer 103 does not change. During this time, the Controller/Recorder also records the position of the control valve, and through the relationship established beforehand, it calculates the flow through the control valve for each instant of time during Step 8.
10. The flow determined in Step 9 is the desired measurement of the transient response.

Figure 3:
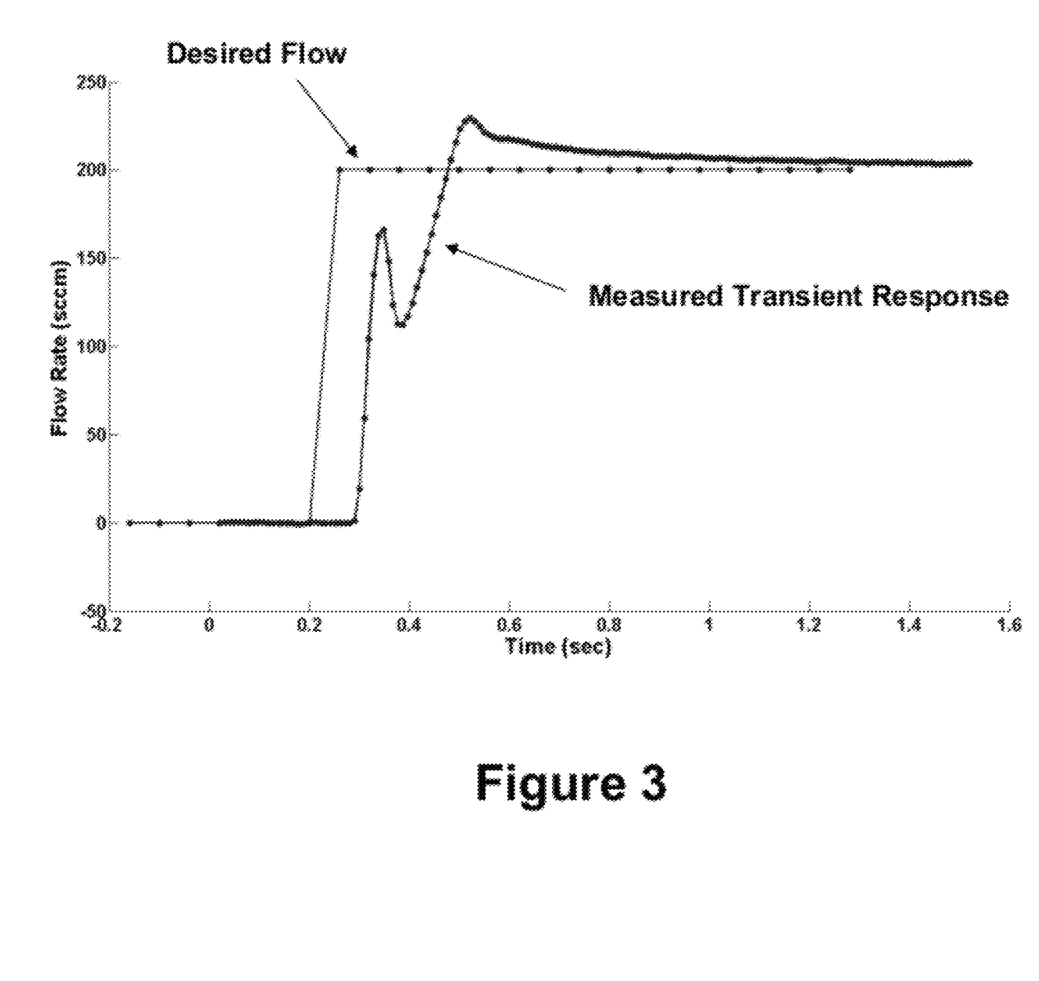
FIG. 3 is an example of a transient response of a typical MFC.
Figure 4:
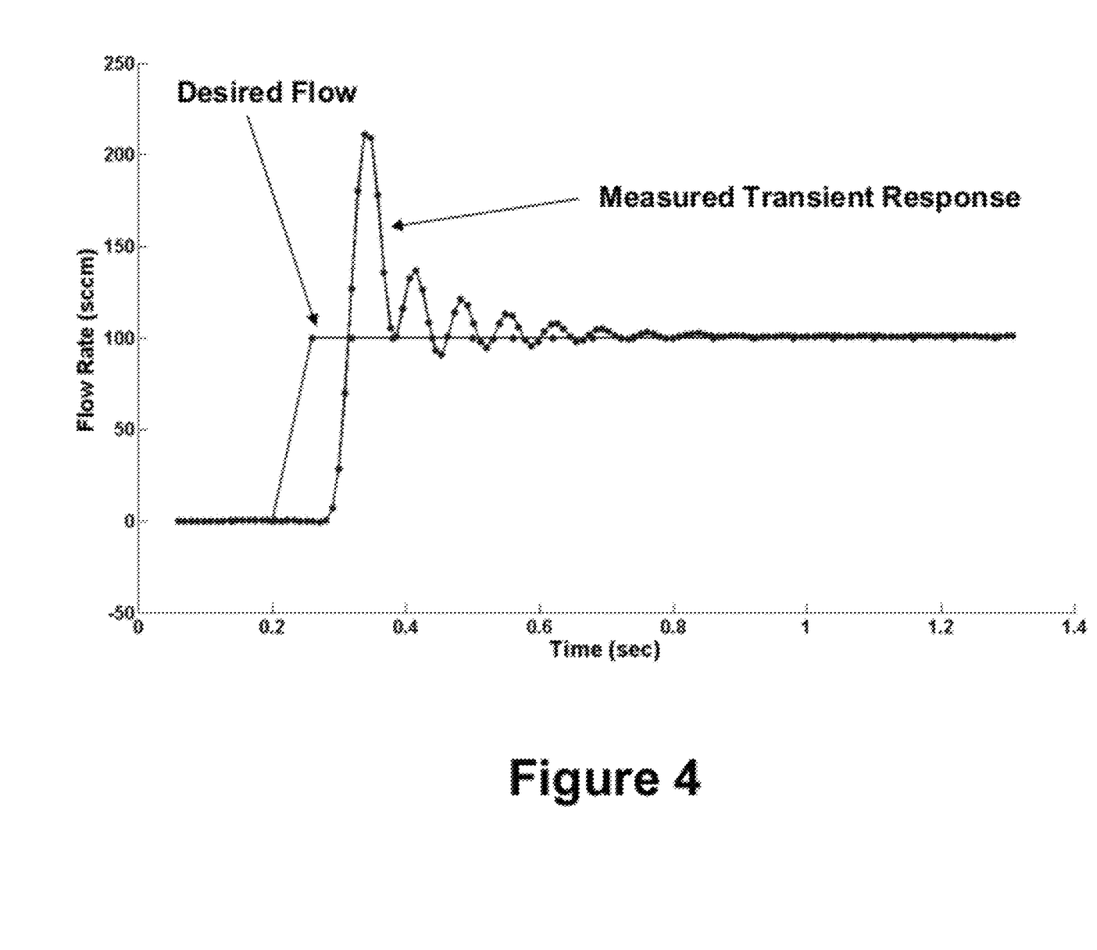
FIG. 4 is an example of a transient response of another typical MFC.

Typical examples of measured transient responses for industry-standard MFCs are shown in FIG. 3 and FIG. 4. In both of these figures, the desired transient responses are shown, where the flow is instructed to turn on in a very well controlled manner from no flow to the desired flow, and also shown are the actual transient responses of the MFCs, where overshoot and oscillations can be observed.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for measuring the transient response of a mass flow controller (MFC), the MFC being installed in a gas flow system comprising:
 a variable orifice positioned upstream of the MFC, wherein a position of the variable orifice controls the variable orifice's size;
 a sensor measuring the position of the variable orifice;
 a pressure transducer positioned between the variable orifice and the MFC; and,
 a controller/recorder for controlling the size of the variable orifice;
 the method comprising:
 configuring the controller/recorder to control the variable orifice such that regardless of the flow through the MFC, the pressure between the MFC and the variable orifice remains constant;
 storing in the controller/recorder a relationship between the position of variable orifice and flow rate through the variable orifice;
 configuring the controller/recorder to receive position data from the sensor;
 programming the controller/recorder to calculate the flow through the variable orifice at each instance using the position data and the relationship between the variable orifice's position and flow rate through the variable orifice;
 wherein prior to starting measurement of the transient response, a set pressure between the variable orifice and the MFC is established by performing the ordered steps comprising:
 a. setting the variable orifice to its maximum desirable position;
 b. turning on the MFC to its desired flow rate and allowing gas to flow until steady state is reached;
 c. determining the pressure drop across the variable orifice;
 d. closing the variable orifice and turning off the MFC, while making certain to maintain pressure between the control valve and the MFC that was established in Step c;
 e. changing the position of the variable orifice as needed to keep the reading of the second pressure transducer unchanged;
 f. starting transient response measurement by turning on the MFC to the desired flow rate while controlling the variable orifice so as to maintain the pressure established in step c.

2. The method of claim 1, wherein the relationship between the size of the variable orifice and the flow through the orifice is predetermined.

3. The method of claim 1, further comprising placing a second pressure transducer upstream of the variable orifice.

4. The method of claim 1, further comprising the steps following step f:
 g. calculating the flow through the variable orifice for each instant of time during Step f using the position of variable orifice and the stored relationship between the relationship between the position of the variable orifice and flow rate through the variable orifice.

5. The method of claim 1, wherein the variable orifice is a control valve.

6. The method of claim 5, wherein the control valve contains a piezoelectric actuator.

7. In an apparatus having a mass flow controller (MFC), a control valve positioned upstream of the MFC, a first pressure transducer positioned upstream of the control valve, and a second pressure transducer positioned between the control valve and the MFC, a method for measuring transient response of the MFC, the method comprising the ordered steps:
 a. setting the control valve to its maximum desirable position;
 turning on the MFC to its desired flow rate and allowing gas to flow until steady state is reached;
 b. determining the pressure drop across the control valve by subtracting the pressure of second pressure transducer from that of first pressure transducer;
 c. using a combination of the control valve and the MFC, setting the pressure between the control valve and the MFC such that the pressure drop across the control valve is at least equal to that determined in step b;
d. closing the control valve and turning off the MFC, while making certain to maintain the pressure between the control valve and the MFC that was set in Step c;
e. changing the position of the control valve as needed to keep the reading of the second pressure transducer unchanged;
f. turning on the MFC to the desired flow rate, and allowing gas to flow until steady state is reached;
g. during step f, controlling the position of the control valve such that the pressure measured by the second pressure transducer does not change, and recording the position of the control valve at each instance during step f;
h. calculating the flow through the control valve for each instant of time during Step f using the recorded position of the control valve and a priori determined relationship between the position of the control valve and flow rate through the control valve.

8. The method of claim 7, wherein step c comprises one of: the pressure is increased by opening the control valve while the MFC is turned off, or the pressure is decreased by turning on the MFC while the control valve is closed.

* * * * *